United States Patent [19]

Scherzer et al.

[11] Patent Number: 5,585,410
[45] Date of Patent: Dec. 17, 1996

[54] BEAD-FORM, EXPANDABLE STYRENE POLYMERS HAVING A REDUCED INTERNAL WATER CONTENT, AND THEIR PREPARATION

[75] Inventors: Dietrich Scherzer, Neustadt; Klaus Hahn, Kirchheim; Michael Riethues, Ludwigshafen; Dieter Naegele, Worms; Michael Witt, Ludwigshafen; Wolfram Husemann, Neustadt, all of Germany

[73] Assignee: BASF Aktiengesellschaft, Ludwigshafen, Germany

[21] Appl. No.: 436,637

[22] Filed: May 8, 1995

Related U.S. Application Data

[63] Continuation of Ser. No. 199,012, Feb. 18, 1994, abandoned.

[30] Foreign Application Priority Data

Feb. 25, 1993 [DE] Germany ................ 43 05 697.0

[51] Int. Cl.⁶ .................................................. C08J 9/20
[52] U.S. Cl. ................................ 521/56; 521/57; 521/60
[58] Field of Search .................... 521/56, 57, 60

[56] References Cited

U.S. PATENT DOCUMENTS

| | | | |
|---|---|---|---|
| 3,224,984 | 12/1965 | Roper et al. | 54/98 |
| 5,011,863 | 4/1991 | Godfrin | 521/56 |
| 5,071,882 | 12/1991 | Godfrin | 521/56 |
| 5,104,903 | 4/1992 | Hahn et al. | 521/56 |
| 5,229,429 | 7/1993 | Hahn et al. | |

FOREIGN PATENT DOCUMENTS

| | | |
|---|---|---|
| 450694 | 1/1991 | European Pat. Off. |
| 3347279 | 7/1985 | Germany |
| 997356 | 7/1965 | United Kingdom |
| 1012277 | 12/1965 | United Kingdom |

*Primary Examiner*—Morton Foelak
*Attorney, Agent, or Firm*—Keil & Weinkauf

[57] ABSTRACT

Bead-form, expandable styrene polymers containing, based on the styrene polymer, from 0.005 to 1.5% by weight of polyethylene wax and from 0.005 to 1% by weight of dimeric α-methylstyrene, and a process for the preparation thereof.

2 Claims, No Drawings

BEAD-FORM, EXPANDABLE STYRENE POLYMERS HAVING A REDUCED INTERNAL WATER CONTENT, AND THEIR PREPARATION

This application is a continuation of application Ser. No. 08/199,012, filed on Feb. 18, 1994 now abandoned.

The present invention relates to bead-form, expandable styrene polymers having a reduced internal water content and improved expandability, and to a process for their preparation. In particular, the present invention relates to bead-form, expandable styrene polymers which contain a polyethylene wax and dimeric α-methylstyrene.

Foams based on styrene polymers have achieved considerable industrial importance as a material for heat insulation and packaging. They are produced on an industrial scale by first preparing expandable styrene polymers by suspension polymerization of styrene in the presence of a blowing agent, expanding these polymers by heating to give foam particles, and then welding the particles in molds to give moldings.

This suspension polymerization is carried out in the presence of suspension stabilizers and conventional styrene-soluble polymerization catalysts.

Expandable styrene polymers (EPSs) prepared by suspension polymerization have a certain internal water content immediately after the polymerization. This internal water content must be reduced by drying, which is expensive and time-consuming. In spite of the drying, this water results, on further processing, in foams having impaired product properties, in particular impaired heat-insulation properties.

On the other hand, expandable styrene polymers have good foaming properties and enable very low foam densities to be achieved for many purposes.

However, an improvement in the foaming properties is achieved in known expandable styrene polymers at the expense of an increase in the internal water content.

It is an object of the present invention to provide bead-form, expandable styrene polymers having a reduced internal water content with unimpaired, preferably improved, expandability.

We have found that this object is achieved by bead-form, expandable styrene polymers containing, based on the styrene polymer, from 0.005 to 1.5% by weight of a polyethylene wax and from 0.005 to 1% by weight of dimeric α-methylstyrene.

The present invention also provides a process for the preparation of bead-form, expandable styrene polymers by polymerizing styrene, in the presence or absence of further comonomers, in aqueous suspension in the presence of suspension stabilizers and conventional styrene-soluble polymerization catalysts and with addition of a blowing agent and with or without addition of conventional additives in effective amounts, where the aqueous suspension contains, based on the monomers, from 0.005 to 1.5% by weight of a polyethylene wax and from 0.005 to 1% by weight of dimeric α-methylstyrene.

EP-B-106 129 describes the use of dimeric α-methylstyrene as molecular weight regulator in the preparation of expandable styrene polymers.

DE-A-15 20 790 discloses a process for the preparation of porous polymer products and the expandable polyvinylaromatic compositions used therein, in which the polymerization is carried out in aqueous suspension in the presence of from 0.01 to 1% by weight of an organic resinous polymer which is a polyethylene wax having a molecular weight of from about 1500 to 2500.

The use of 0.1% by weight of a polyethylene wax significantly reduced the cooling time of corresponding polystyrene foam moldings.

GB-A-1,012,277 discloses foamable polystyrene and a process for the processing thereof. The foamable polystyrene particles comprise polystyrene, a volatile blowing agent and from 0.1 to 10% by weight, based on polystyrene, of a wax. This achieves, inter alia, a reduction in the cooling time of moldings produced therefrom. Excellent results were achieved using polyethylene wax. In a process for the preparation of this wax-containing foamable polystyrene, the wax is employed at least toward the end of the suspension polymerization of styrene.

EP-A-409 694 discloses expandable polymer beads obtained by polymerizing at least one vinylaromatic monomer in aqueous suspension in the presence of from 0.01 to 0.6% by weight of at least one polyethylene wax and from 0.005 to 0.1% by weight of at least one nonionic surfactant having an HLB value of from 7 to 16, in each case based on the vinylaromatic monomers.

GB-A-997 356 discloses waxes as nucleating agents for EPS. Polyethylene waxes having molecular weights of from 1500 to 2500 are said to have particularly favorable properties.

For the purposes of the present invention, styrene polymers are polystyrene and copolymers of styrene with other α,β-olefinically unsaturated compounds, which copolymers contain at least 50 parts by weight of styrene. Examples of suitable comonomers according to the invention are therefore α-methylstyrene, ring-halogenated styrenes ring-alkylated styrenes, acrylonitrile, esters of acrylic or methacrylic acid with alcohols having up to 8 carbon atoms, N-vinyl compounds, such as vinylcarbazole, or small amounts of compounds containing two polymerizable double bonds, such as butadiene, divinylbenzene or butanediol diacrylate.

The blowing agents employed according to the invention are generally, based on the styrene polymer, from 1 to 10% by weight, preferably from 3 to 8% by weight, of a $C_3$- to $C_7$-hydrocarbon (eg. propane, butane, isobutane, n-pentane, i-pentane, neopentane and/or hexane) and/or carbon dioxide.

If carbon dioxide is used as a blowing agent or blowing agent constituent, it may be advantageous to use a carbon dioxide absorber, as described in German Patent Application P 41 37 405.3.

The styrene polymers may also contain conventional additions of other substances which give the expandable products certain properties. Examples which may be mentioned are flameproofing agents based on organic bromine or chlorine compounds, such as trisdibromopropyl phosphate, hexabromocyclododecane, chlorinated paraffin, and synergists for flameproofing agents, such as dicumyl peroxide and highly unstable organic peroxides; furthermore antistatics, stabilizers, dyes, lubricants, fillers and substances which have an anti-adhesive action during prefoaming, such as zinc stearate, melamine-formaldehyde condensates or silicic acid, and agents for shortening the demolding time during expansion, for example glycerol esters or hydroxycarboxylates. Depending on the intended action, the additives may be homogeneously distributed in the particles or in the form of a surface coating.

The additives are correspondingly added during the process according to the invention or applied subsequently to the expandable styrene polymers.

The bead-form, expandable styrene polymers according to the invention contain as essential constituents, in each case based on the styrene polymer, from 0.005 to 1.5% by weight, preferably from 0.01 to 1.0% by weight, particularly preferably from 0.05 to 0.5% by weight, of a polyethylene wax and from 0.005 to 1.0% by weight, preferably from 0.01 to 0.5% by weight, particularly preferably from 0.04 to 0.4% by weight, of dimeric α-methylstyrene, and from 0.1 to 0.6% by weight of dicumyl peroxide, preferably from 0.2 to 0.6% by weight, as catalyst.

Only use of both polyethylene wax and dimeric α-methylstyrene gives an expandable styrene polymer having a reduced internal water content and at the same time good or improved expandability.

The polyethylene wax employed according to the invention generally has a mean molecular weight (number average) of from 2000 to 6000, preferably from 2000 to 4000, particularly preferably from 2800 to 3500. A particularly suitable polyethylene wax is wax®AF31 from BASF Aktiengesellschaft, which has a mean molecular weight of 3000.

The dimeric α-methylstyrene employed according to the invention is a commercially available product.

The suspension polymerization of styrene is known per se and is described in detail in Kunstoff-Handbuch, Volume V, "Polystyrol", Carl Hanser-Verlag, 1969, pages 679 to 688. In general, styrene, if appropriate together with the above-mentioned comonomers, is suspended in water, and organic or inorganic suspension stabilizers are added.

In the process according to the invention, bead-form, expandable styrene polymers are prepared by polymerizing styrene, if desired with up to 50% by weight of the above-mentioned comonomers, in aqueous suspension, the above-mentioned blowing agents and, if desired, conventional additives in effective amounts being added before, during or after the polymerization. It is essential to the invention that the aqueous suspension contains, based on the monomers, from 0.005 to 1.5% by weight of a polyethylene wax and from 0.005 to 1% by weight of dimeric α-methylstyrene (DMS) and from 0.1 to 0.6% by weight of dicumyl peroxide, preferably from 0.2 to 0.6% by weight, as catalyst.

The wax is generally either introduced at the beginning or added during the polymerization at a conversion of up to about 50%.

The dimeric α-methylstyrene can likewise be introduced at the outset or later.

It is particularly advantageous to introduce the wax at the outset and to meter in the dimeric α-methylstyrene during the polymerization, for example together with the blowing agent used.

The suspension polymerization is generally carried out in the presence of suspension stabilizers and conventional styrene-soluble polymerization catalysts.

The suspension stabilizers used here, in addition to molecular colloids, such as polyvinyl alcohol (PVA) and polyvinyl pyrrolidone (PVP), are usually sparingly soluble salts, such as $Ca_3(PO_4)_2$ (Pickering salts) in combination with an extender, such as dodecylbenzenesulfonate.

For the purposes of the present invention, extenders are taken to mean compounds which increase the ability of sparingly soluble inorganic compounds to stabilize suspensions. The extenders partially hydrophobicize the inorganic Pickering salt, which is hydrophilic per se. This salt is thus forced specifically into the surface of the polymerizing styrene droplets.

When the polymerization is complete, the bead-form, expandable styrene polymers obtained are, in a known manner, separated off from the aqueous phase, washed and dried.

The blowing agent-containing styrene polymer particles prepared according to the invention generally have a diameter of from 0.2 to 4 mm. They can be pre-foamed by conventional methods, for example by means of steam, to give foam particles having a diameter of from 0.1 to 2 cm and a bulk density of from 0.005 to 0.1 g/cm$^3$.

The prefoamed particles can then be foamed by conventional methods to give foam moldings having a density of from 0.005 to 0.1 g/cm$^3$.

The invention has a number of advantages. Thus, the bead-form, expandable styrene polymers according to the invention generally have internal water contents of from 0.3 to 0.5% by weight, based on the styrene polymer, which means that expensive and time-consuming drying and subsequent conditioning are unnecessary. The bead-form, expandable sytrene polymers according to the invention can be processed directly after preparation, have good expandability and give homogeneous, fine-celled foams.

In addition, the stability of the suspension during the polymerization is improved in the process according to the invention.

EXAMPLES 1 TO 2 AND COMPARATIVE EXAMPLES 1 TO 5

Example 1

A pressure-tight 50 l stainless steel stirred reactor was charged with a mixture of 19.5 kg of fully demineralized water, 19.5 g of $Na_4P_2O_7$, 52.7 g of $MgSO_4$ 17 g of Luwax®AF31 (polyethylene wax from BASF Aktiengesellschaft, having a mean molecular weight of 3000) and 10.2 g of dimeric α-methylstyrene (DMS). 17 kg of styrene, 17 g of dibenzoyl peroxide and 51 g of dicumyl peroxide were added.

The mixture was heated from 25 to 100° C. over the course of 2 hours and subsequently from 100 to 130° C. over the course of 5 hours, and was then kept at 130° C. for a further 3 hours.

478 g of a 10% strength aqueous polyvinylpyrrolidone solution (K value 90) were added to the mixture 55 minutes after a temperature of 80° C. had been reached, and 1.3 kg of pentane were added after a further 125 minutes.

The resultant beads were centrifuged off, dried by means of cool air in countercurrent and coated with 0.1% by weight, based on the weight of the uncoated beads, of ethylbisstearamide.

The-bead size fraction from 1.00 to 2.00 mm was then removed by sieving and coated with 0.2% by weight of a mixture of 90% by weight of glycerol monostearate and 10% by weight of silicic acid FK320 (Goldschmidt).

Part of this bead size fraction was used to determine the internal water content by Karl-Fischer titration.

The remainder of this fraction was subsequently prefoamed in a Rauscher batch prefoamer, stored for 12 hours, and expanded in an automatic bench unit from Erlenbach at a vapor pressure of 1.2 bar (overpressure) to give a foam cube.

The demolding time of the latter (ie. the time for pressure dissipation) was measured. Cuts through the foam molding were used to count the number of cells per mm under an incident-light microscope.

The measurement results are shown in the table.

Example 2

The procedure was similar to that of Example 1, but the DMS was added together with the pentane 180 minutes after a temperature of 80° C. had been reached.

Comparative Example 1

The procedure was similar to that of Example 1, but no polyethylene wax or DMS were added.

Comparative Example 2

The procedure was similar to that of comparative Example 1, but 5.1 g of hexabromocyclododecane and 1.7 g of ammonium sulfate were introduced at the outset.

Comparative Example 3

The procedure was similar to that of comparative Example 1, but 3.4 g of tert-dodecyl mercaptan were added 180 minutes after a temperature of 80° C. had been reached.

Comparative Example 4

The procedure was similar to that of Example 1, but no DMS was added.

Comparative Example 5

The procedure was similar to that of Example 1, but no polyethylene wax was added.

Comparative Example 6

The procedure was similar to that of comparative Example 2, but in addition 3.4 g of tert-dodecyl mercaptan were added 180 minutes after a temperature of 80° C. had been reached.

The measurement results for the examples and comparative examples are shown in the table.

TABLE

| | Internal water content % | Number of cells $mm^{-1}$ | Demolding time sec | Molding density g/l |
|---|---|---|---|---|
| Example 1 | 0.4 | 13 | 140 | 11 |
| Example 2 | 0.3 | 13 | 130 | 10 |
| Comparative Ex. 1 | 0.6 | 5 | 600 | 16 |
| Comparative Ex. 2 | 1.3 | 15 | 110 | 13 |
| Comparative Ex. 3 | 1.0 | 8 | 260 | 11 |
| Comparative Ex. 4 | 0.5 | 12 | 310 | 13 |
| Comparative Ex. 5 | 0.6 | 6 | 550 | 12 |
| Comparative Ex. 6 | 1.5 | 16 | 90 | 12 |

We claim:

1. A process for preparing bead-form expandable polymers having a reduced internal water content, which process comprises polymerizing styrene in an aqueous suspension, said suspension comprising (a) dibenzoyl peroxide;

(b) dicumyl peroxide in an amount of from 0.1 to 0.6% by weight, based on the monomers;

(c) dimeric α-methylstyrene in an amount of from 0.005 to 1% by weight, based on the monomers;

(d) a polyethylene wax in an amount of from 0.005 to 1.5%, based on the monomers;

(e) a suspension stabilizer; and (f) a blowing agent.

2. The process of claim 1, wherein the amount of dicumyl peroxide used is from 0.2 to 0.6% by weight.

* * * * *